United States Patent
Tang et al.

(10) Patent No.: US 12,122,376 B2
(45) Date of Patent: Oct. 22, 2024

(54) SYSTEM AND METHOD FOR CONTROLLING VEHICLE PROPULSION

(71) Applicant: Delphi Technologies IP Limited, St. Michael (BB)

(72) Inventors: Li Tang, Troy, MI (US); Neeraj Rama, Rochester Hills, MI (US); Peter Michael Olin, Ann Arbor, MI (US)

(73) Assignee: Delphi Technologies IP Limited, Saint Michael (BB)

( * ) Notice: Subject to any disclaimer, the term of this patent is extended or adjusted under 35 U.S.C. 154(b) by 259 days.

(21) Appl. No.: 17/885,050

(22) Filed: Aug. 10, 2022

(65) Prior Publication Data

US 2024/0051533 A1    Feb. 15, 2024

(51) Int. Cl.
*B60W 30/16* (2020.01)
*B60W 30/14* (2006.01)
*B60W 40/105* (2012.01)

(52) U.S. Cl.
CPC ........ *B60W 30/143* (2013.01); *B60W 40/105* (2013.01); *B60W 2554/80* (2020.02); *B60W 2556/10* (2020.02)

(58) Field of Classification Search
CPC .... B60W 30/143; B60W 30/16; B60W 30/00; B60W 30/14; B60W 30/146; B60W 40/105; B60W 2556/10; B60W 2554/80; B60W 50/0097
See application file for complete search history.

(56) References Cited

U.S. PATENT DOCUMENTS

| | | | |
|---|---|---|---|
| 10,501,087 B2 | 12/2019 | Deragarden et al. | |
| 10,759,303 B2 | 9/2020 | Duan et al. | |
| 2011/0184642 A1* | 7/2011 | Rotz | G01C 21/3469 |
| | | | 701/533 |
| 2015/0298680 A1 | 10/2015 | Matthews | |
| 2018/0001764 A1 | 1/2018 | Bang | |

(Continued)

FOREIGN PATENT DOCUMENTS

| | | |
|---|---|---|
| DE | 102018122975 A1 | 12/2018 |
| EP | 3680140 A1 | 7/2020 |
| KR | 101307855 B1 | 9/2013 |

OTHER PUBLICATIONS

European Patent Application 23189985.7—Extended European Search Report dated Dec. 15, 2023.

*Primary Examiner* — Tan Q Nguyen
(74) *Attorney, Agent, or Firm* — Dickinson Wright PLLC

(57) ABSTRACT

A method for controlling vehicle propulsion may include identifying at least one route characteristic of a portion of a route being traversed by a vehicle and determining a profile for a target vehicle speed based on the at least one route characteristic and a vehicle energy consumption profile. The method may also include, in response to detecting a lead vehicle, determining a vehicle speed of the lead vehicle and determining whether to avoid triggering initiation of the vehicle follow mode by the vehicle propulsion controller based on (i) a distance between the vehicle and a triggering threshold and (ii) the vehicle speed of the vehicle. The method may also include, in response to not triggering vehicle follow mode, determining, based on the vehicle speed of the lead vehicle and the profile for the target vehicle speed, a traveling distance between the vehicle and a trigger threshold.

20 Claims, 9 Drawing Sheets

(56) References Cited

U.S. PATENT DOCUMENTS

| | | | |
|---|---|---|---|
| 2018/0105158 A1* | 4/2018 | Namuduri | B60W 40/076 |
| 2018/0290645 A1 | 10/2018 | Zhao et al. | |
| 2019/0367032 A1 | 12/2019 | Ito et al. | |
| 2020/0062126 A1 | 2/2020 | Duan et al. | |
| 2020/0215917 A1 | 7/2020 | Schoning et al. | |
| 2020/0269689 A1 | 8/2020 | Zebiak et al. | |
| 2021/0001850 A1 | 1/2021 | Shamshiri et al. | |
| 2023/0058169 A1* | 2/2023 | Cella | G06N 3/042 |

* cited by examiner

SYSTEM AND METHOD FOR CONTROLLING VEHICLE PROPULSION

GOVERNMENT LICENSE RIGHTS

This invention was made with government support under the DE-AR0000794 contract awarded by the United States Department of Energy, Advanced Research Projects Agency (ARPA-E). The government has certain rights in the invention.

TECHNICAL FIELD

This disclosure relates to vehicle propulsion control, and in particular to systems and methods for improving vehicle energy efficiency through vehicle propulsion control.

BACKGROUND

Vehicles, such as cars, trucks, sport utility vehicles, crossovers, mini-vans, or other suitable vehicles, may include various automatic vehicle propulsion control systems, such as cruise control, adaptive cruise control, and the like. Typically, such systems receive input from a driver that indicates a desired vehicle speed. The automatic vehicle propulsion control systems typically interact with various vehicle components, such as a throttle, brake system, and the like, to achieve the desired speed.

The automatic vehicle propulsion control systems may be capable of maintaining the desired vehicle speed by adjusting a torque demand provided to various vehicle components, such is the case with cruise control, or may be capable of maintaining the desired vehicle speed and adjusting the vehicle speed to maintain a safe distance from a lead vehicle (e.g., a vehicle immediately in front of the vehicle operating the automatic vehicle propulsion control system), such is the case with adaptive cruise control. However, such systems are not capable of bringing the vehicle to a complete stop, as is the case with cruise control, or not capable of bringing the vehicle to a complete stop in the absence of a lead vehicle, as is the case with adaptive cruise control. Further, such systems are not able to continue vehicle propulsion after stopping without further input from the driver, such as the driver actuating a resume switch.

SUMMARY

This disclosure relates generally to vehicle propulsion control systems and methods. An aspect of the disclosed embodiments is a method for controlling vehicle propulsion. The method includes identifying at least one route characteristic of a portion of a route being traversed by a vehicle. The method further includes determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle. The method further includes receiving, from a vehicle propulsion controller, a signal indicating a detection of a lead vehicle. The method further includes determining a vehicle speed of the lead vehicle. The method further includes determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller. The method further includes, in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold. The method further includes determining an adjusted profile for the target vehicle speed based on the traveling distance and the profile for the target vehicle speed. The method further includes controlling, using the vehicle propulsion controller, vehicle speed of the vehicle to achieve the target vehicle speed associated with the adjusted profile and/or one or more energy consumption optimization calculations.

Another aspect of the disclosed embodiments is an apparatus for controlling vehicle propulsion. The apparatus includes a memory and a processor. The memory includes instructions executable by the processor that facilitate the performance of operations comprising identifying at least one route characteristic of a portion of a route being traversed by a vehicle. The apparatus further includes determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle. The apparatus further includes receiving, from a vehicle propulsion controller, a signal indicating a detection of a lead vehicle. The apparatus further includes determining a vehicle speed of the lead vehicle. The apparatus further includes determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller. The apparatus further includes, in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold. The apparatus further includes determining an adjusted profile for the target vehicle speed based on the traveling distance and the profile for the target vehicle speed. The apparatus further includes controlling, using the vehicle propulsion controller, vehicle speed of the vehicle to achieve the target vehicle speed associated with the adjusted profile and/or one or more energy consumption optimization calculations.

Another aspect of the disclosed embodiments is a non-transitory computer-readable storage medium. The non-transitory computer-readable medium includes executable instructions that, when executed by a processor, facilitate performance of operations, comprising identifying at least one route characteristic of a portion of a route being traversed by a vehicle. The non-transitory computer-readable medium further facilitates the performance of operations including determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle. The non-transitory computer-readable medium further facilitates the performance of operations including receiving, from a vehicle propulsion controller, a signal indicating a detection of a lead vehicle. The non-transitory computer-readable medium further facilitates the performance of operations including determining a vehicle speed of the lead vehicle. The non-transitory computer-readable medium further facilitates the performance of operations including determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller. The non-transitory computer-readable medium further facilitates the performance of operations including, in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold. The non-transitory computer-readable medium further facilitates the performance of operations including determining an adjusted profile for the target vehicle speed based on the traveling distance and the profile for the target vehicle speed. The non-transitory computer-readable medium further facilitates the performance of operations including controlling, using the vehicle propulsion controller, vehicle speed of the vehicle to achieve the target vehicle speed associated with the adjusted profile and/or one or more energy consumption optimization calculations.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
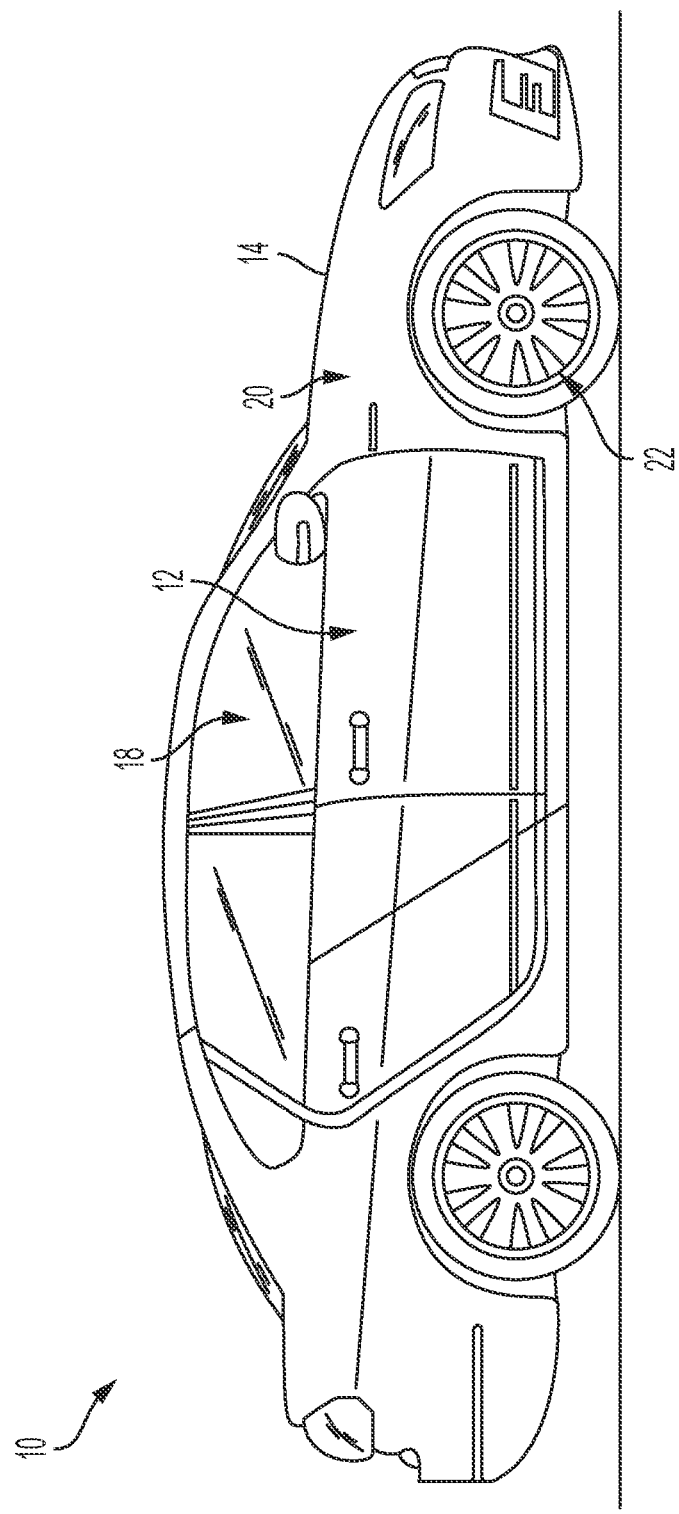
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, may include various automatic vehicle propulsion control systems that may provide a level of automation for the vehicle. For example, a vehicle may include cruise control, adaptive cruise control, automatic braking, a fully autonomous vehicle control system, or any suitable vehicle propulsion control system or a combination thereof. Typically, systems such as cruise control and adaptive cruise control receive input from a driver that indicates a desired vehicle speed. In the case of a fully autonomous vehicle, the autonomous vehicle control systems may determine a vehicle speed based on posted speed limits and a variety of safety systems and protocols. The automatic vehicle propulsion control systems typically interact with various vehicle components, such as a throttle, brake system, and the like, to achieve the desired speed.

Because of modeling errors or traffic disturbances, the current vehicle states may not be the same as expected by the initial optimal policy, which may lead to suboptimal performance or even divergence from optimality if the same policy is followed. Further, a receding horizon-based algorithm (e.g., which is also known as, and may be referred to herein, a rollout algorithm), may be used to predict and update the initial optimal policy over a variable horizon at a variable frequency. Therefore, the rollout algorithm updates the initial optimal policy by always starting the new policy or prediction with the current states. This recurrent correction keeps the performance aligned with the true optimal policy.

While autonomous vehicles may be able to bring the vehicle to a complete stop, cruise control systems are merely capable of maintaining the desired vehicle speed by adjusting a torque demand provided to various vehicle components, and adaptive cruise control systems are merely capable of maintaining the desired vehicle speed and adjusting the vehicle speed to maintain a safe distance from a lead vehicle (e.g., a vehicle immediately in front of the vehicle operating the automatic vehicle propulsion control system). However, such systems are not able to continue vehicle propulsion without further input from the driver (i.e., after being stopped for greater than a predetermined amount of time), such as the driver actuating a resume switch. In addition to the above, the automatic vehicle propulsion control systems described are not capable of controlling vehicle propulsion in order to achieve a desired energy consumption (e.g., fuel, battery, and the like) efficiency.

Accordingly, systems and methods, such as those disclosed herein, that provide vehicle propulsion control in order to achieve an optimum energy consumption may be desirable. In some embodiments, the systems and methods described herein may be configured to utilize a supervisory controller (SC) which receives route information and generates an initial optimal control policy for the vehicle. The generated policy may include an optimal policy and, when used, may result in minimized energy consumption (e.g., as long as captured route information holds true). Driving can be complex and difficult to predict. As such, the systems and methods described herein may be configured to use, a receding horizon-based algorithm (e.g., which is also known as, and may be referred to herein, a rollout algorithm), to predict and update the initial optimal policy for a predetermined horizon at a predetermined frequency. The rollout algorithm may address the loss of optimality due to modeling errors, traffic disturbances, and/or the like.

The systems and methods described herein may be configured to adapt the speed limits used in the algorithm based on an estimation of a speed of a lead vehicle. For example, when the road speed limit is 45 mph, while the lead vehicle is traveling 40 mph, an autonomous proportional control aspect of the vehicle (e.g., such as adaptive cruise control (ACC), and the like), may set the effective speed limit for the ego vehicle at 40 mph.

Typically, the ACC of the ego vehicle may detect the lead vehicle at a greater distance (e.g., from the lead vehicle) than the distance at which the ACC initiates a vehicle following mode (e.g., where the ego vehicle follows the lead vehicle at a safe distance). The systems and methods described herein may be configured to generate an optimal policy that allows the ego vehicle to remain at a safe speed and distance from the lead vehicle, avoiding ACC from initiating the vehicle following mode, which may allow for optimized longitudinal control of the ego vehicle.

In some embodiments, the systems and methods described herein may be configured to allow the ego vehicle to enter the vehicle following mode. The ego vehicle being allowed to enter ACC vehicle following mode, may result in a maximum regenerative torque required to meet safety criteria which may leave no room for optimal control. The systems and methods described herein may be configured to provide optimal torque assist in ACC vehicle following mode (e.g., if reacceleration is needed).

The systems and methods described herein may be configured to detect a lead vehicle. When a lead vehicle is detected, the information available from a radio detection and ranging detection (RADAR) is range (S) and range rate (Ṡ). The system and methods described herein may be configured to, using the speed of the ego vehicle, estimate the speed of the lead vehicle as:

$V_{leading} = V_{ego} + \dot{S}$

When $t_c$ is defined as the critical closing time between vehicles that triggers the ACC vehicle following mode, then the associated trigger distance ($S_{trig}$) may be defined as:

$S_{trig} = (V_{ego} - V_{leading}) \times t_c$

The systems and methods described herein may be configured to stay far enough back from the lead vehicle in order to avoid triggering initiation of a vehicle follow mode by the ACC vehicle follow (e.g., which may reduce the potential for optimal control). The ego vehicle follows the lead vehicle at a calibratable distance ($dS_{cal}$) that is greater than the ACC trigger distance ($S_c$) which is defined as:

$S_c = S_{trig} + dS_{cal}$

At a predetermined time, the systems and methods described herein may be configured to calculate the distance from the ego vehicle to the desired following point behind the lead vehicle ($S_{vehspdlim}$), which may be defined as:

$$S_{vehspdlim} = S - S_c$$
$$= S - [S_{trig} + dS_{cal}]$$
$$= S - [(V_{ego} + V_{leading}) \times t_c + dS_{cal}]$$

As described, the ego vehicle may include an ACC system, which may detect a lead vehicle. Once detected, the systems and methods described herein may be configured to calculate $S_{vehspdlim}$. Additionally, or alternatively, the systems and methods described herein may be configured to solve the receding horizon optimization using a virtual speed change sign at the calculated distance The systems and methods described herein may be configured to, based on a set of optimization constraints, determine the virtual speed limit, as the assumption that the ego vehicle is catching up with a lead vehicle, which may be lower than a current actual speed limit of the route being traversed by the ego vehicle.

At each subsequent recalculation of the receding horizon logic, the systems and methods described herein may be configured to recalculate the distance to the targeted following distance of the lead vehicle, $S_{vehspdlim}$, and will be input into the receding horizon optimization. For example, when the lead vehicle maintains a constant speed, and all other constraints remain the same along the route, then the ego vehicle will slow down (based on the optimal policy generated by the receding horizon) until it reaches the targeted distance behind the lead vehicle, $S_c$, (and traveling the same speed as the lead vehicle). When the lead vehicle's speed changes, or other route conditions change, then subsequent updates of the receding horizon optimization will adapt to those changes.

The systems and methods described herein may be configured to remain out of vehicle following mode. When selecting $dS_{cal} > 0$, the ego vehicle remains far enough behind the lead vehicle to remain out of vehicle following mode, and the receding horizon logic fully determines the ego vehicle optimized target speed. In order to maintain some robustness to uncertainties (e.g., minor speed variation in the lead vehicle) the calibration may be set to a value greater than zero.

The systems and methods described herein may be configured to decelerate optimally into vehicle following mode. When selecting $dS_{cal} = 0$, the ego vehicle preferably slows down to the point of entering vehicle following mode. Once in vehicle following mode, the receding horizon logic can continue to determine the optimal torque split (for hybrid applications), and the ACC system will determine vehicle speed.

The systems and methods described herein may be configured to enter vehicle following mode when it is determined that the ego vehicle cannot slow down quickly enough to avoid going into ACC vehicle following mode. This may happen when, for example, the closing speed between the vehicles is so high that the maximum allowed deceleration rate of the intelligent driving system would need to be violated to achieve a $dS_{cal} > 0$. The physics of this possibility are described further below. In such a situation, a mode can be implemented that subsequently slows the ego vehicle slightly, dropping it back out of vehicle following mode, and into the scenario described above.

The systems and methods described herein may be configured to enter vehicle following mode when the systems and methods described herein determine that on a multi-lane route, it is better to avoid controlling to a distance $dS_{cal}>0$. The systems and methods described herein may be configured to avoid triggering initiation of a vehicle follow mode by the ACC vehicle follow for the ego vehicle in order to minimize the distance to the lead vehicle and to reduce the likelihood of surrounding traffic pulling into the space between the two vehicles.

When setting the new speed limit, the systems and methods described herein may be configured to check the ability to achieve the target speed, which is constrained by the peak deceleration rate $a_{max}$. The mean deceleration rate $\bar{a}$ is used in checking the condition:

$$\bar{a} = \frac{V_{ego}^2 - V_c^{lim2}}{2 \cdot (S - S_c)} \leq a_{max}$$

When the above condition is not satisfied, the new speed limit is calculated based on $a_{max}$.

$$V_{new}^{lim} = \sqrt{V_{ego}^2 - 2 \cdot a_{max} \cdot (S - S_c)}$$

With the assumption that $V_{new}^{lim}$ respects the official speed limits on the road, the final expression of $V_{new}^{lim}$ takes the following form.

$$V_{new}^{lim} = \begin{cases} \frac{S - S_c}{t_c} + V_{leading}, & \text{if } \bar{a} \leq a_{max} \\ \sqrt{V_{ego}^2 - 2 \cdot a_{max} \cdot (S - S_c)}, & \text{if } \bar{a} > a_{max} \end{cases}$$

Where $S_c$, $t_c$, and $a_{max}$ are calibrations that are subjected to change depending on application. As the systems and methods described herein may be configured to avoid triggering initiation of a vehicle follow mode by the ACC to operate in intelligent vehicle following mode when the supervisory controller respects $V_{new}^{lim}$. When $\bar{a} > a_{max}$ the ACC will allow the ego vehicle to go into vehicle following mode.

As described above, there exist certain scenarios where the vehicle may be allowed to go into ACC vehicle following mode or automatic emergency braking mode. In either case, for optimal control, the vehicle recuperates energy while reducing speed. The systems and methods described herein may be configured to reduce vehicle speed and maintain a safe headway distance to the lead vehicle using the motor generator unit (MGU) driven by ACC. When the systems and methods described herein detect a target vehicle and command a deceleration to maintain the headway distance, the MGU torque is back calculated using linear vehicle dynamics as follows:

$$T_{MGU} = \frac{1}{\Gamma_{MGU}} \left( \frac{(m\dot{v}_x + (A + Bv_x + Cv_x^2) + mg\sin\beta)r_d}{\Gamma_{TC}\Gamma_{trans}\Gamma_{diff}} - T_{eng} \right)$$

Where the engine torque (Nm) and MGU Torque (Nm) are expressed as $T_{eng}$ and $T_{MGU}$ respectively. Further, where vehicle mass (kg), vehicle speed (ms−1), and vehicle acceleration (ms−2) are expressed as m, $v_x$, and $\dot{v}_x$ respectively. Further, where gravitational acceleration (ms−2) is represented as g. Further, where tire radius (m) and road inclination (°) are expressed as $r_d$ and β respectively. Further, where MGU gear ratio (−), torque converter torque ratio (−), and transmission gear ratio (−) are expressed as $\Gamma_{MGU}$, $\Gamma_{TC}$, and $\Gamma_{trans}$ respectively. Further, A (N), B (N/ms−1), C (N/ms−2) are road load coefficients.

In some embodiments, the systems and methods described herein may be configured to optimally manage vehicle speed limits to maintain safe following speed that may minimize the chances of the vehicle propulsion controller (such as the ACC, or other suitable controllers) initiating vehicle following mode. The systems and methods described herein may be configured to recover energy as much as possible from the road while ACC controls deceleration and optionally uses torque assist to reaccelerate in vehicle following mode.

In some embodiments, the systems and methods described herein may be configured to identify at least one route characteristic of a portion of a route being traversed by a vehicle. The systems and methods described herein may be configured to determine a profile for a target vehicle speed based on the at least one route characteristic and a vehicle energy consumption profile. The systems and methods described herein may be configured to receive, from a vehicle propulsion controller, a signal indicating a detection of a lead vehicle. The systems and methods described herein may be configured to determine a vehicle speed of the lead vehicle. The systems and methods described herein may be configured to determine whether to avoid triggering initiation of a vehicle follow mode by the vehicle propulsion controller based on (i) a distance between the vehicle and a triggering threshold and (ii) the vehicle speed of the vehicle. The triggering threshold may correspond to a distance to the lead vehicle at which the vehicle follow mode is initiated by the vehicle propulsion controller. The systems and methods described herein may be configured to, in response to determining to avoid triggering initiation of the vehicle follow mode by the vehicle propulsion controller, determine, based on the vehicle speed of the lead vehicle and the profile for the target vehicle speed, a traveling distance between the vehicle and a trigger threshold. The systems and methods described herein may be configured to determine an adjusted profile for the target vehicle speed based on the traveling distance and the profile for the target vehicle speed. The systems and methods described herein may be configured to control, using the vehicle propulsion controller, vehicle speed of the vehicle to achieve the target vehicle speed associated with the adjusted profile.

The systems and methods described herein may be configured to determine a deceleration rate for following the lead vehicle and determine whether the deceleration rate for following the lead vehicle is less than, or equal to, the a peak deceleration rate of the vehicle.

The systems and methods described herein may be configured to, when the deceleration rate for following the lead vehicle is greater than or equal to the peak deceleration rate, adjust the profile for the target vehicle speed based on the speed of the lead vehicle.

The systems and methods described herein may be configured to, in response to: when the deceleration rate for following the lead vehicle is being less than the peak deceleration rate, set the speed limit to the peak deceleration rate of the vehicle.

The systems and methods described herein may be configured to determine whether to avoid triggering initiation of the vehicle follow mode by the vehicle propulsion controller includes calculating a vehicle speed for avoiding the trigger threshold.

The systems and methods described herein may be configured to, in response to determining that the lead vehicle is not detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle.

The systems and methods described herein may be configured to control, by the vehicle propulsion controller, the vehicle speed of the vehicle to achieve the target vehicle speed associated with the adjusted profile includes using at least one virtual input provided to the vehicle propulsion controller.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
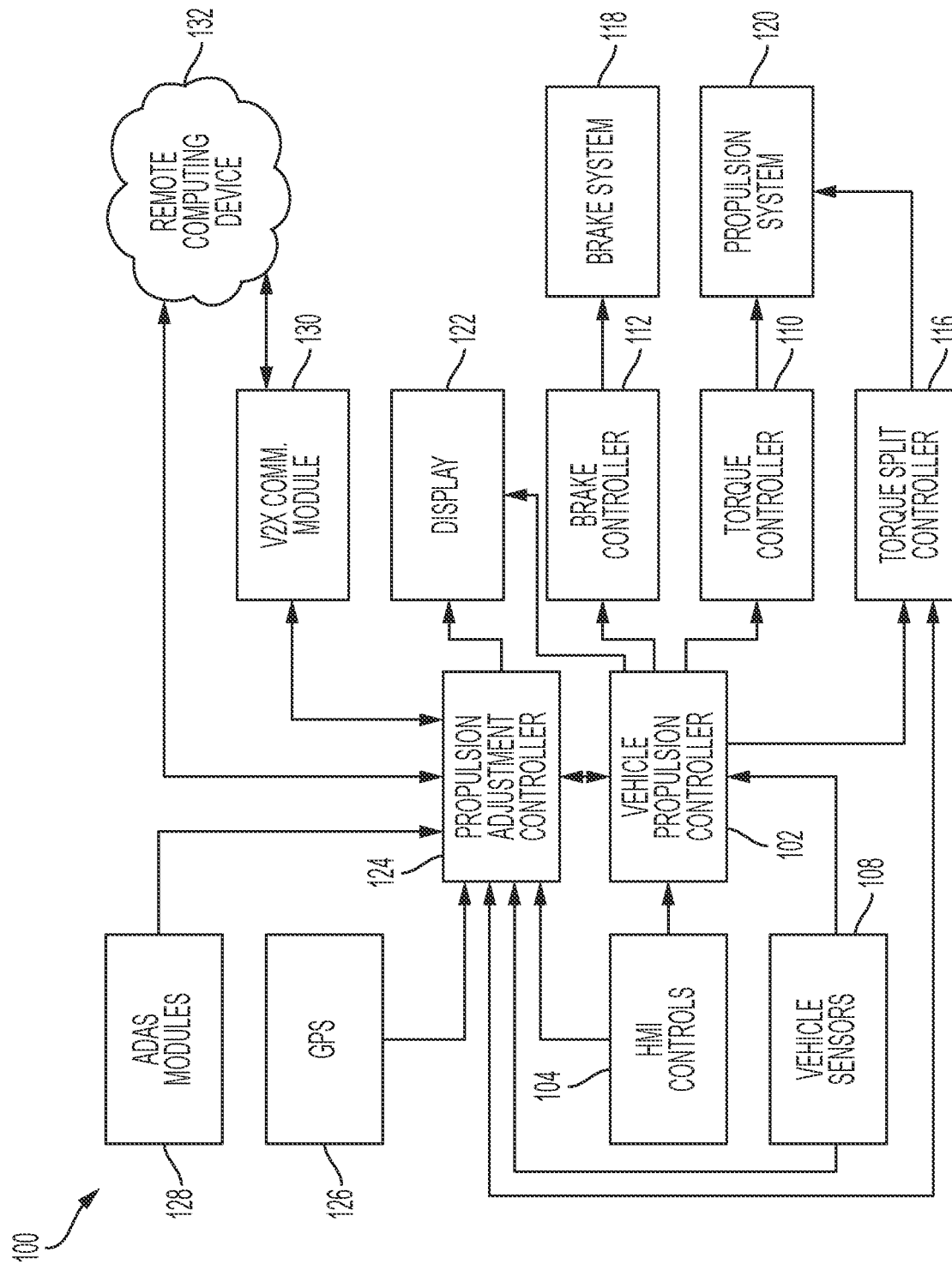
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the vehicle. For example, the PAC 124 may be disposed on a memory and executed by a processor. It should be understood that the system 100 may include any combination of computing devices, either disposed locally in the vehicle 10 and/or disposed remotely, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102. The signal may indicate a desired vehicle speed selected by the driver. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, RADAR, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the driver may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that are actuated in response to the brake controller 112 implementing braking procedures based on the plurality of signals from the VPC 102. In some embodiments, the VPC 102 may implement engine braking through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the driver indicates to resume vehicle propulsion control using the HMI controls 104 (e.g., the VPC 102 is not configured to resume vehicle propulsion control without interaction from the driver). In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a steep incline) the internal combustion engine may provide at least a portion of vehicle propulsion in order to assist the electric motor. The VPC 102 communicates the torque split to the torque split controller 116. The torque split controller 116 is in communication with the propulsion system 120 to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the driver using the HMI controls 104 based on the signal from the safety controls. For example, the driver may increase the desired vehicle speed which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve vehicle safety and road safety. The ADAS modules 128 may be configured to automate and/or adapt and enhance vehicle systems for safety and better driving. The ADAS modules 128 may be configured to alert the driver of the vehicle 10 of upcoming traffic conditions or disabled vehicles and/or to alert the vehicle 10 of a vehicle proximate to the vehicle 10 in order to avoid collisions and accidents. Further, the ADAS modules 128 may autonomously avoid collisions by implementing safeguards and taking over control of the vehicle 10, such as, by initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X module communication 130. The V2X communication module 130 is configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make and model of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SpaT) from a smart algorithm used by a traffic data provider. The SpaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the driver's vehicle speed relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the driver of the vehicle 10 with a recommended vehicle speed. In some embodiments, the VPC 102 may include an adaptive cruise control mechanism. As described, the adaptive cruise control mechanism is configured to maintain the desired vehicle speed provided by the driver of the vehicle 10 using the HMI controls 104, and the adaptive cruise control mechanism is configured to maintain a safe distance between the vehicle 10 and a lead vehicle. Further, the adaptive cruise control mechanism is configured to bring the vehicle 10 to a complete stop in response to the lead vehicle coming to a complete stop. As described, the adaptive cruise control mechanism may be incapable of restarting vehicle propulsion without interaction from the driver of the vehicle 10 (i.e., after being stopped for a predetermined amount of time). Additionally, the adaptive cruise control mechanism is incapable of bringing the vehicle 10 to a complete stop in the absence of a lead vehicle. Accordingly, the VPC 102 (e.g., the adaptive cruise control mechanism) cannot take advantage of energy efficient vehicle propulsion control (e.g., such as a coasting to a stop in response to a determination that vehicle 10 is approaching a stop sign). The PAC 124 is configured to determine a target vehicle propulsion profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132.

The PAC 124 is configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10. The PAC 124 uses the vehicle energy consumption profile to identify a vehicle speed (within a threshold range of the desired vehicle speed provided by the driver to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate profiles for target vehicle speeds and/or target torque splits, such that, the vehicle 10 maintains an optimum or improved energy consumption while maintaining driver and/or passenger comfort (e.g., by avoiding sudden, unnecessary changes in vehicle speed).

In some embodiments, the PAC 124 may be configured to determine when the vehicle 10 should coast to achieve optimum or improved energy consumption of the vehicle 10. For example, the PAC 124 may use known traffic conditions, as described, to determine when the vehicle 10 should coast. Additionally, or alternatively, the PAC 124 may learn traffic conditions, as described, and may determine whether the vehicle 10 should coast in areas along a route known to typically have traffic based, for example, on time of day. In some embodiments, the PAC 124 may use SpaT information to determine when the vehicle 10 should coast in response to change traffic signals. Additionally, or alternatively, the PAC 124 may determine to increase the target vehicle speed associated with the profile for the target vehicle speed (e.g., within the posted speed limit) in order to increase a likelihood that the vehicle 10 will arrive at a traffic signal while the traffic signal indicates to proceed, which may allow the vehicle 10 to avoid having to stop at traffic signals, based on traffic single timing.

In some embodiments, the PAC 124 may be configured to calculate a coast function and/or a road load function (see the Equation (1)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters can then be updated using a coast self-learning function, such that the PAC 124 identifies or requests a coast sequence, (e.g., from historical information and/or from the remote computing device 132) and calculates the coast function result. The PAC 124 may calculate the coast function when requested by the driver of the vehicle 10 who would be prompted to perform a particular learning maneuver by the PAC 124, or could be learned in the background.

Velocity dependent resistive forces: F=wind, tires, bearings, and other forces plus acceleration dependent inertial forces plus grade dependent gravitational forces:

$$F=(A+(B*v)+(C*v2))+((1+\text{drive axle \%}+\text{non-drive axle \%})*(\text{Test Mass}*\text{acceleration}))+(\text{Test Mass}*g*\sin(\arctan(\text{grade \%}))) \quad \text{Equation (1)}$$

Where A represents the resistive force that is constant and does not vary with velocity (e.g., bearings, seals, tires, etc.,), B represents the resistive force that varies linearly with velocity (e.g., drive train, differential, etc.), and C represents the resistive force that varies with the square of velocity (e.g., wind, tire deformation, etc.)

As described, the PAC 124 may control or interface with the VPC 102 and/or interface with the driver of the vehicle 10 in order to achieve the target vehicle speed and/or target torque split profiles, which may result in optimum or improved energy consumption efficiency of the vehicle 10. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control or interface with the VPC 102 using virtual inputs in order to achieve the target vehicle speed and/or target torque split profiles. As described, the VPC 102 may receive a desired vehicle speed from the driver of the vehicle 10 using the HMI controls 104. Additionally, or alternatively, the VPC 102 (e.g., when the VPC 102 includes an adaptive cruise control mechanism) may adjust the desired vehicle speed in response to a lead vehicle's speed.

In some embodiments, the PAC 124 initializes the VPC 102 using the desired speed provided by the driver of the vehicle 10 the first time the driver of the vehicle 10 engages the VPC 102 during a key cycle. The PAC 124 may then provide the virtual inputs to the VPC 102 in order to control vehicle speed to achieve optimum or improved energy consumption efficiency of the vehicle 10. In some embodiments, the PAC 124 may generate a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile. The PAC 124 is in communication with and/or interfaces with the HMI controls 104. The PAC 124 substitutes HMI signals provided by the driver of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the driver using the HMI controls 104, as described. The VPC 102 may determine whether to apply the target vehicle speed and/or the target torque split indicated by the virtual HMI signals based on the safety controls.

In some embodiments, the PAC 124 generates a virtual input that includes a virtual lead car in order to control the VPC 102 to bring the vehicle 10 to a complete stop in the absence of an actual lead car. For example, the PAC 124 may bring the vehicle 10 to a stop as the vehicle 10 approaches a stop sign, a traffic signal, traffic, a disabled vehicle, or other suitable stopping conditions that the vehicle 10 may encounter, as described. The PAC 124 substitutes information received by the VPC 102 from the vehicle sensors 108 (e.g., information the VPC 102 uses to detect an actual lead car) with virtual information, signals, and/or inputs corresponding to the virtual lead car.

The VPC 102 detects the presence of the virtual lead car and performs operations associated with following a lead car (e.g., maintain a safe distance between the vehicle 10 and the lead car, keeping pace with the lead car, and bringing the vehicle to a stop in response to the lead car being within an object range of the vehicle 10 and coming to a complete stop). The PAC 124 may then control a virtual speed of the virtual lead car based on the target vehicle speed profile. The VPC 102 may then adjust the current vehicle speed of the vehicle 10 to follow the virtual lead car. In this manner, the PAC 124 may achieve the target vehicle speed profile of the vehicle 10 to provide optimum or improved energy consumption efficiency of the vehicle 10. While the PAC 124 is controlling the VPC 102 using the virtual inputs described, the vehicle sensors 108, such as cameras, RADAR, proximity sensors, and the like, continue to provide information to the VPC 102, such that, while the VPC 102 is applying or following the virtual inputs provided by the PAC 124, the VPC 102 may continue to detect actual vehicles or objects in front of the vehicle 10. The safety controls of the VPC 102 are configured to override the VPC 102, including the virtual inputs provided by the PAC 124, to safely bring the vehicle 10 to a complete stop or increase or decrease vehicle speed in response to the information from the vehicle sensors 108

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10. For example, the VPC 102 may be configured to receive HMI signals (e.g., as described), to follow a lead vehicle based on information from the vehicle sensors 108 (e.g., as described), and to receive a recommended target vehicle speed signal from the PAC 124. The VPC 102 may determine whether to apply the target vehicle speed indicated by the recommended target vehicle speed signal, for example, based on the driver input, the detection of a lead vehicle, and/or the safety controls of the VPC 102.

The torque split controller 116 may be configured to receive a recommended torque split signal from the VPC 102 based on the driver input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the PAC 124 may be configured to identify at least one route characteristic of a portion of a route being traversed by the vehicle 10. The PAC 124 may be configured to determine a profile for a target vehicle speed based on the at least one route characteristic and a vehicle energy consumption profile. The PAC 124 may be configured to receive, from the VPC 102, a signal indicating a detection of a lead vehicle. The PAC 124 may be configured to determine a vehicle speed of the lead vehicle. The PAC 124 may be configured to determine a deceleration rate for following the lead vehicle and determine whether the deceleration rate for following the lead vehicle is less than, or equal to, a peak deceleration rate of the vehicle 10. The PAC 124 may be configured to, when the deceleration rate for following the lead vehicle is greater than or equal to the peak deceleration rate, adjust the profile for the target vehicle speed based on the speed of the lead vehicle. The PAC 124 may be configured to, in response to: when the deceleration rate for following the lead vehicle is being less than the peak deceleration rate, set the speed limit to achieve the peak deceleration rate of the vehicle 10.

The PAC 124 may be configured to determine whether to avoid triggering initiation of a vehicle follow mode by the VPC 102 based on (i) a distance between the vehicle 10 and a triggering threshold and (ii) the vehicle speed of the vehicle 10. The triggering threshold may correspond to a distance to the lead vehicle at which the vehicle follow mode is initiated by the VPC 102. The PAC 124 may be configured to determine whether to avoid triggering initiation of the vehicle follow mode by the VPC 102 t includes calculating the vehicle speed for avoiding the trigger threshold. The PAC 124 may be configured to, in response to determining to avoid triggering initiation of the vehicle follow mode by the VPC 102 t, determine, based on the vehicle speed of the lead vehicle and the profile for the target vehicle speed, a traveling distance between the vehicle 10 and a trigger threshold. The PAC 124 may be configured to determine an adjusted profile for the target vehicle speed based on the traveling distance and the profile for the target vehicle speed. The PAC 124 may be configured to control, using the VPC 102, vehicle speed of the vehicle 10 to achieve the target vehicle speed associated with the adjusted profile.

The PAC 124 may be configured to, in response to determining that the lead vehicle is not detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle 10. The PAC 124 may be configured to control, by the VPC 102, the vehicle speed of the vehicle 10 to achieve the target vehicle speed associated with the adjusted profile includes using at least one virtual input provided to the VPC 102.

In some embodiments, the PAC 124 may communicate with the display 122 to provide an indicator to the driver that the vehicle speed is changing in order to improve energy consumption efficiency of the vehicle 10. For example, the PAC 124 may use the display 122 to illustrate an energy efficiency symbol that indicates to the driver of the vehicle 10 that the vehicle speed is changing in order to improve energy consumption efficiency of the vehicle 10.

In some embodiments, as described, the VPC 102 may not include an adaptive cruise control system and may include a basic cruise control system. Additionally, or alternatively, the driver of the vehicle 10 may not engage the VPC 102 in order to control propulsion of the vehicle 10 (e.g., the driver of the vehicle 10 may control propulsion manually). Accordingly, the PAC 124 is configured to provide a recommendation to the driver indicating a target vehicle speed of a target vehicle speed profile. The recommendation may be provided to the driver of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the driver of the vehicle 10 using a mobile computing device within the vehicle 10. The recommendation may include a symbol or textual information that indicates to the driver of the vehicle 10 to increase or decrease vehicle speed. Additionally, or alternatively, the recommendation can include a coast recommendation that is displayed for a calibratable amount of time and is then withdrawn in response to the driver of the vehicle 10 ignoring the recommendation. The recommendation can include information indicating that the recommendation is in response to a change in speed limit, a stop sign being approached by the vehicle 10, traffic signal timing, and status, or other information. The information may be visually displayed and may decay as the vehicle 10 recommendation becomes obsolete.

The driver of the vehicle 10 may determine to honor the recommendation and change the vehicle speed accordingly, or the driver may choose to ignore the recommendation. The PAC 124 may be configured to monitor drive action in response to the recommendation to determine whether the driver of the vehicle 10 honored the recommendation or ignored the recommendation. The PAC 124 may determine whether to adjust recommendations based on the monitored driver action. For example, the PAC 124 may determine not to recommend coasting in response to the driver ignoring a threshold number of coasting recommendations. Additionally, or alternatively, the PAC 124 may determine, using the monitored driver action and the route traversed by the vehicle 10, whether the driver of the vehicle 10 honors the recommendation at certain portions of the route and ignores the recommendations at other portions of the route. The PAC 124 may selectively provide the recommendations to the driver of the vehicle 10 based on the monitored driver action and the vehicle route. Additionally, or alternatively, the PAC 124 may monitor the driver action in response to the recommendation based on traffic patterns, stop signs, traffic signals, and the like. The PAC 124 may selectively determine whether to provide the driver of the vehicle 10 the recommendations based on the monitored driver action in response to traffic patterns, stop signs, traffic signals, and the like.

In some embodiments, the PAC 124 and/or the VPC 102 may perform the methods described herein. However, the methods described herein as performed by the PAC 124 and/or the VPC 102 are not meant to be limiting, and any type of software executed on a controller can perform the methods described herein without departing from the scope of this disclosure. For example, a controller, such as a processor executing software within a computing device onboard the vehicle 10, can perform the methods described herein.

Figure 3:
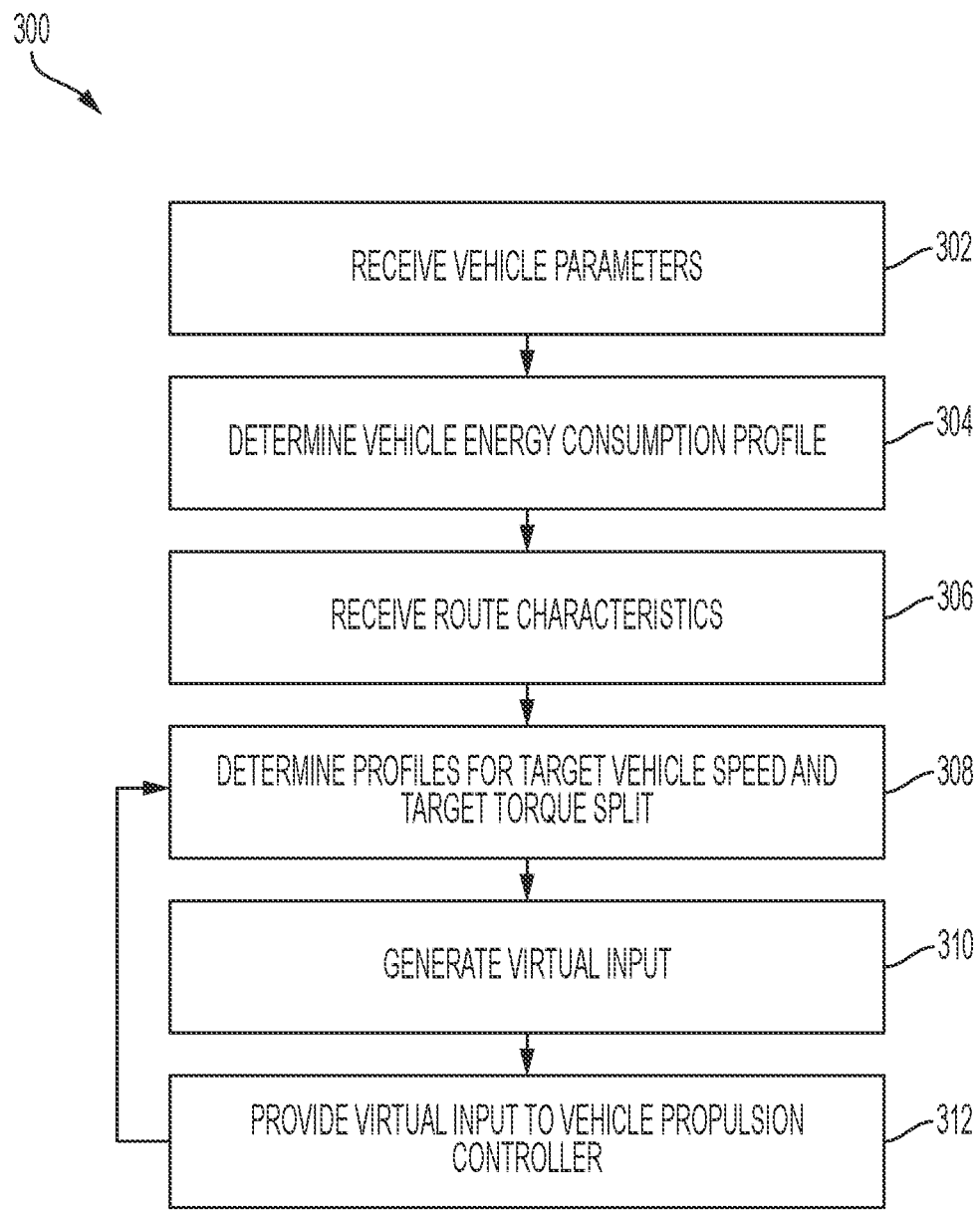
FIG. 3 is a flow diagram generally illustrating a vehicle propulsion control method according to the principles of the present disclosure.

FIG. 3 is a flow diagram generally illustrating a vehicle propulsion control method 300 according to the principles of the present disclosure. At 302, the method 300 receives vehicle parameters. As described, the PAC 124 may receive various vehicle parameters of the vehicle 10 from any of the components described herein. At 304, the method 300 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130), other suitable route characteristics, or a combination thereof. At 306, the method 300 receives route characteristics. As described, the PAC 124 receives various route characteristics (e.g., route characteristics for a route the vehicle 10 is either currently traversing or will traverse) and other information from any other components described herein. In some embodiments, the method continues at 308. In some embodiments, the method continues at 310. At 308, the method 300 determines profiles for a target vehicle speed and/or a target toque split. As described, the PAC 124 determines profiles for a target vehicle speed and/or a target torque split based on the vehicle parameters, the route characteristics, the energy consumption profile of the vehicle 10, other information received, as described, from the various components described herein. The profiles of the target vehicle speed and/or target vehicle torque split correspond to a vehicle speed and/or a torque split that, when achieved by the vehicle 10, provide an optimum, or improved energy consumption efficiency of the vehicle 10.

At 310, the method 300 generates at least one virtual input. As described, the PAC 124 may generate at least one virtual input. The virtual input may include a virtual HMI signal, a virtual lead vehicle, a calculated value (e.g., such as an optimized target speed or other suitable value), or other suitable virtual input. The virtual input, when applied by the VPC 102, achieves the target vehicle speed and/or the target torque split. At 312, the method 300 provides the virtual input to the vehicle propulsion controller. As described, the PAC 124 may substitute HMI signals communicated from the HMI controls 104 based on input from the driver of the vehicle 10 with the virtual HMI signals. Additionally, or alternatively, the PAC 124 may substitute vehicle sensor information provided by the vehicle sensors 108 to indicate the virtual lead vehicle to the VPC 102. As described, the VPC 102 may apply the virtual HMI signals and/or may follow the virtual lead vehicle in order to achieve the target vehicle speed and/or torque split. As described, the PAC 124 may continuously update the target vehicle speed and/or target torque split as the vehicle 10 continues to traverse the route and based on updated traffic information, vehicle information, route information, other information, or a combination thereof.

Figure 4:
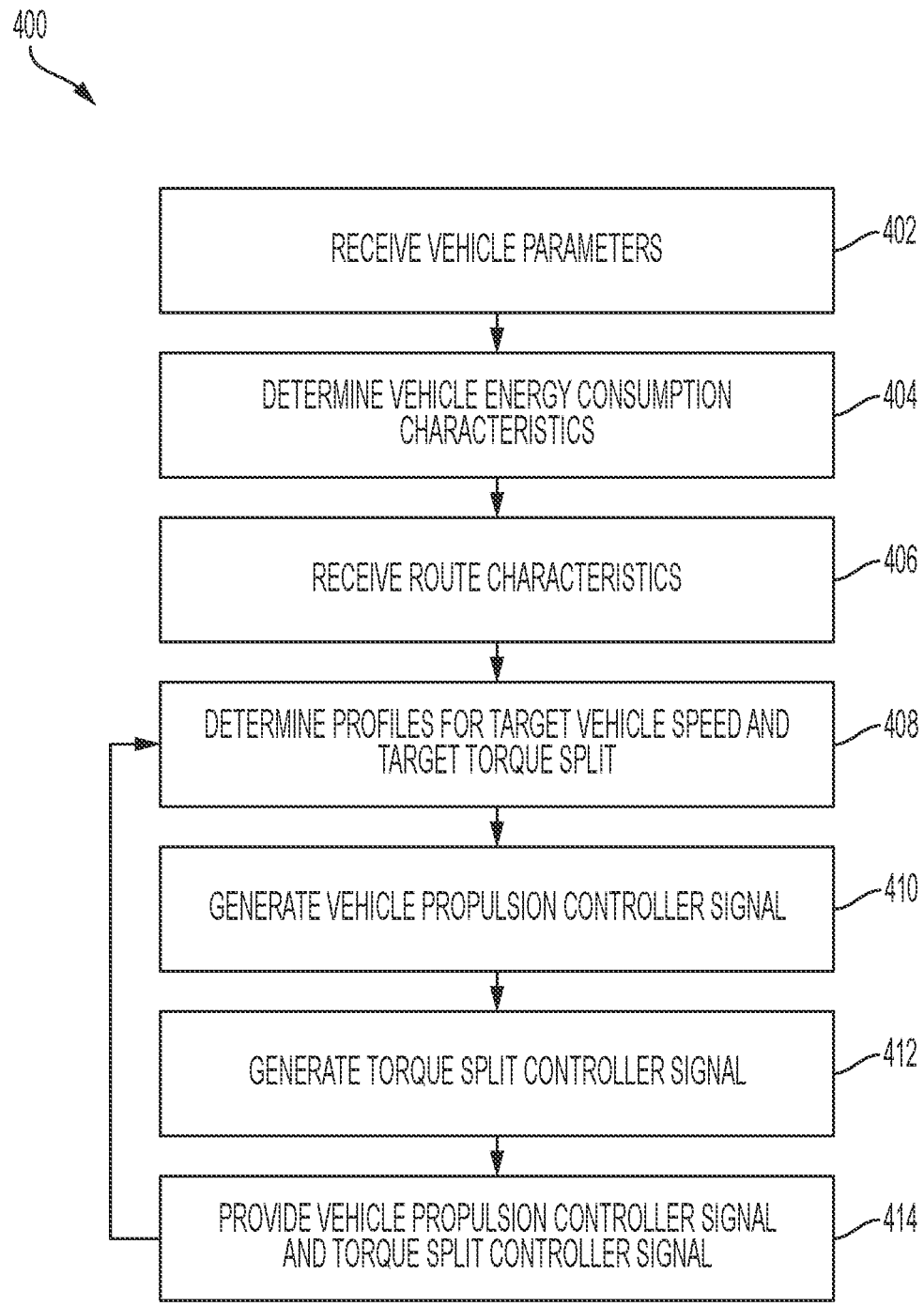
FIG. 4 is a flow diagram generally illustrating an alternative vehicle propulsion control method according to the principles of the present disclosure.

FIG. 4 is a flow diagram generally illustrating an alternative vehicle propulsion control method 400 according to the principles of the present disclosure. At 402, the method 400 receives vehicle parameters. As described, the PAC 124 may receive various vehicle parameters of the vehicle 10 from any of the components described herein. At 404, the method 400 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. At 406, the method 400 receives route characteristics. As described, the PAC 124 receives various route characteristics (e.g., route characteristics for a route the vehicle 10 is either currently traversing or will traverse) and other information from any other components described herein. In some embodiments, the method continues at 408. In some embodiments, the method continues at 410. At 408, the method 400 determines profiles for a target vehicle speed and/or a target toque split. As described, the PAC 124 determines profiles for a target vehicle speed and/or a target torque split based on the vehicle parameters, the route characteristics, the energy consumption profile of the vehicle 10, other information received, as described, from the various components described herein. The profiles for the target vehicle speed and/or target vehicle torque split correspond to a vehicle speed and/or a torque split that, when achieved by the vehicle 10, provide an optimum, or improved energy consumption efficiency of the vehicle 10.

At 410, the method 400 generates a vehicle propulsion controller signal. As described, the PAC 124 is in direct communication with the VPC 102 and may provide signals as an input to the VPC 102. The PAC 124 generates the vehicle propulsion controller signal based on the target vehicle speed. The vehicle propulsion controller signal may be referred to as a recommended target vehicle speed. At 412, the method 400 generates a torque split controller signal. As described, the PAC 124 may be in direct communication with the torque split controller 116 and may provide signals as inputs to the torque split controller 116. The PAC 124 generates the torque split controller signal based on the target torque split. The torque split controller signal may be referred to as a recommended target torque split. At 414, the method 400 provides the vehicle propulsion controller signal and the torque split controller signal. As described, the PAC 124 may provide the vehicle propulsion controller signal to the VPC 102. The VPC 102 may determine whether to apply the target vehicle speed indicated by the vehicle propulsion controller signal, as described. The PAC 124 may provide the torque split controller signal to the torque split controller 116 or may provide the torque split controller signal to the VPC 102, which then may provide the torque split signal to the torque split controller 116. The torque split controller 116 may then determine whether to apply the torque split indicated by the torque split controller signal, as described. The vehicle propulsion controller signal and torque split controller signal correspond to a vehicle speed and/or a torque split that, when achieved by the vehicle 10, provide an optimum, or improved energy consumption efficiency of the vehicle 10. As described, the PAC 124 may continuously update the target vehicle speed and/or target torque split as the vehicle 10 continues to traverse the route and based on updated traffic information, vehicle information, route information, other information, or a combination thereof.

Figure 5:
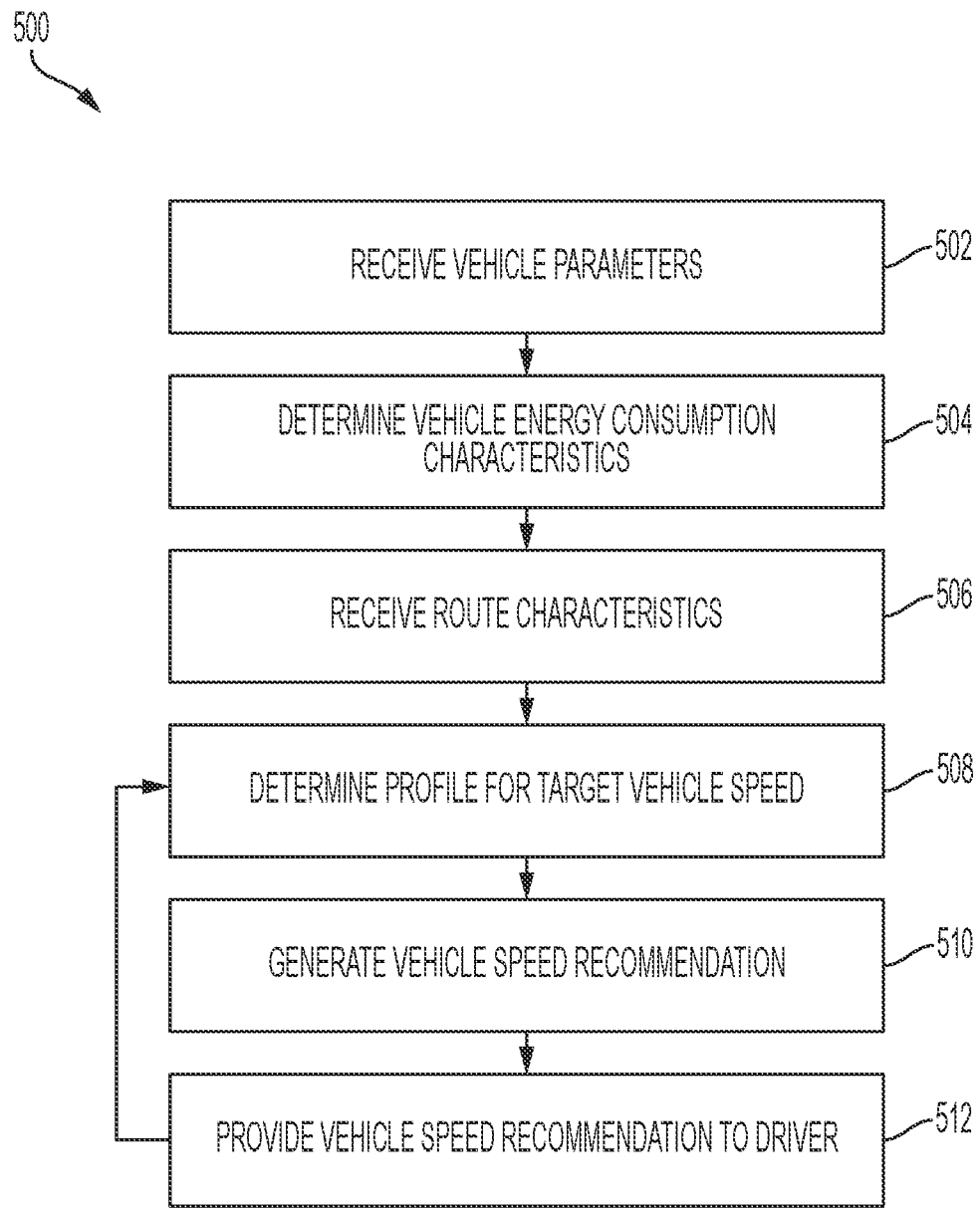
FIG. 5 is a flow diagram generally illustrating an alternative vehicle propulsion control method according to the principles of the present disclosure.

FIG. 5 is a flow diagram generally illustrating an alternative vehicle propulsion control method 500 according to the principles of the present disclosure. At 502, the method 500 receives vehicle parameters. As described, the PAC 124 may receive various vehicle parameters of the vehicle 10 from any of the components described herein. At 504, the method 500 determines a vehicle energy consumption profile. As described, the PAC 124 determines the energy consumption profile for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. At 506, the method 500 receives route characteristics. As described, the PAC 124 receives various route characteristics (e.g., route characteristics for a route the vehicle 10 is either currently traversing or will traverse) and other information from any other components described herein. In some embodiments, the method continues at 508. In some embodiments, the method continues at 510. At 508, the method 500 determines profiles for a target vehicle speed. As described, the PAC 124 determines a profile for a target vehicle speed based on the vehicle parameters, the route characteristics, the energy consumption profile of the vehicle 10, other information received, as described, from the various components described herein. The profile for the target vehicle speed corresponds to a vehicle speed that, when achieved by the vehicle 10, provide an optimum or improved energy consumption efficiency of the vehicle 10.

At 510, the method 500 generates a vehicle speed recommendation. For example, the PAC 124 generates a vehicle speed recommendation based on the profile of the target vehicle speed. At 512, the method 500 provides the vehicle speed recommendation to the driver. As described, the PAC 124 may provide the vehicle speed recommendation to the driver of the vehicle 10 using the display 122, a mobile computing device, or other suitable devices or displays capable of providing the vehicle speed recommendation to the driver of the vehicle 10. As described, the driver of the vehicle 10 may honor the vehicle speed recommendation or ignore the vehicle speed recommendation. The vehicle speed recommendation corresponds to a vehicle speed, when achieved by the vehicle 10, provide an optimum, or improved energy consumption efficiency of the vehicle 10. As described, the PAC 124 may continuously update the profile of the target vehicle speed split as the vehicle 10 continues to traverse the route and based on updated traffic information, vehicle information, route information, other information, or a combination thereof.

Figure 6:
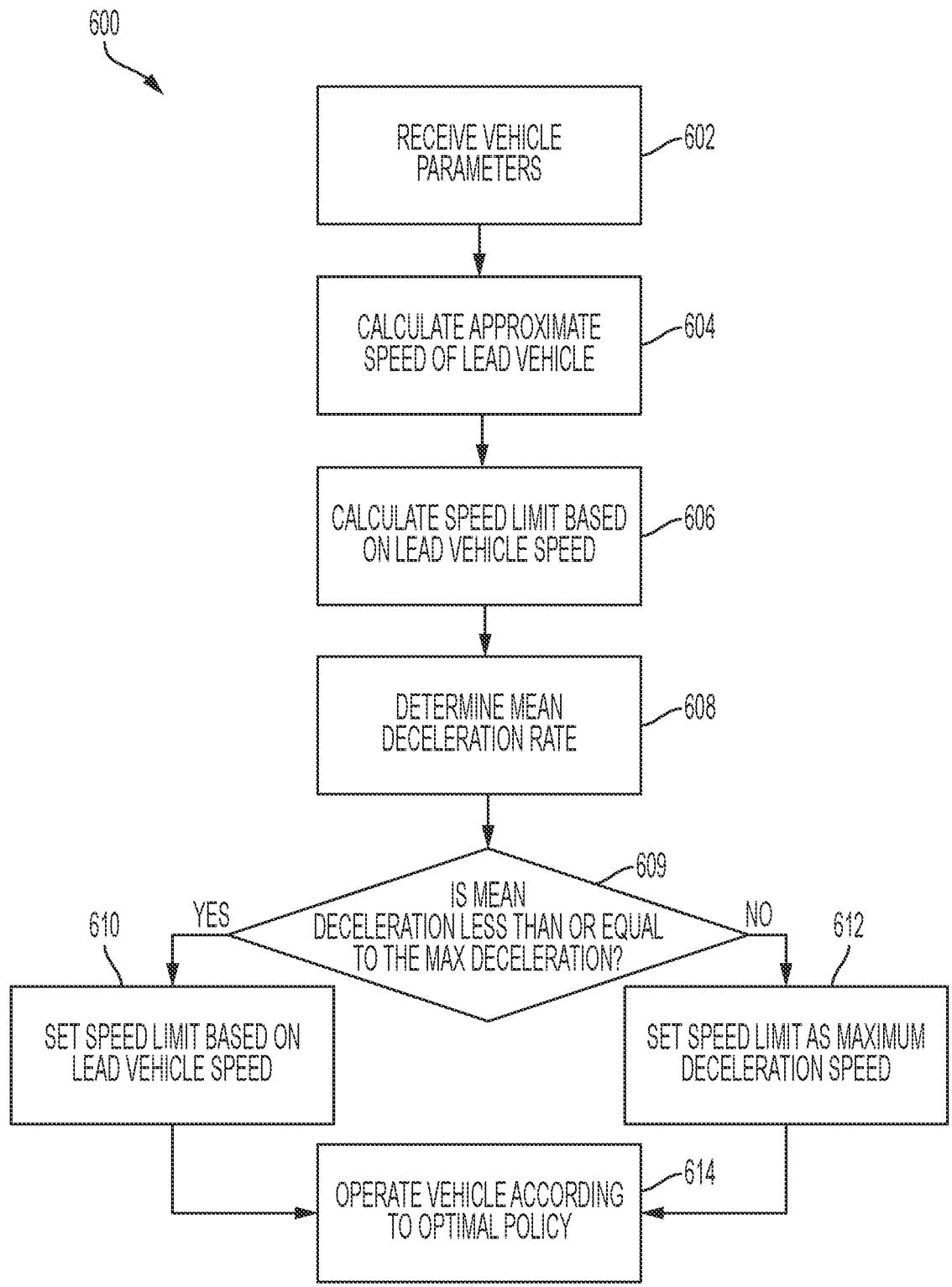
FIG. 6 is a flow diagram generally illustrating an alternative vehicle propulsion control method according to the principles of the present disclosure.

FIG. 6 is a flow diagram generally illustrating an alternative vehicle propulsion control method 600 according to the principles of the present disclosure. At 602, the method 600 receives vehicle parameters. For example, the PAC 124 may receive various vehicle parameters of the vehicle 10 from any of the components described herein. At 604, the method 600 determines if there is a lead vehicle present. The method 600 may further calculate the approximate speed of the lead vehicle.

At 606, the method 600 calculates a speed limit for the vehicle based on the speed determined for the lead vehicle. For example, the PAC may calculate a specific speed for the vehicle, when the road speed limit is 45 mph, but the lead car is traveling 40 mph, then the effective speed limit for the vehicle is 40 mph. It should be understood that, while limited examples are provided, the systems and methods described herein may be configured to determine a vehicle speed limit for any suitable speed limit value. At 608, the method 600 determines a mean deceleration rate. For example, the mean deceleration rate may be required to check the ability of the vehicle to achieve the target speed in the available distance between the vehicle and the lead vehicle.

At 609, the method 600 determines whether or not the mean deceleration is less than or equal to the peak deceleration possible by the vehicle. For example, the PAC, in response to a determination that the condition is satisfied, at 610, the sets a new speed limit for the vehicle based on the lead vehicle speed. As described, method 600 maintains a distance that avoid the vehicle from entering vehicle following mode while following the lead vehicle. While reducing speed to meet this new speed limit, the method 600 further recuperates energy while reducing speed to maintain a safe distance from the lead vehicle. In response to the lead vehicle pulling away, at 614, the method 600 returns to operating the vehicle according to the target speed.

At 609, the method further determines whether the vehicle speed in relation to the lead vehicle leaves open the option of preventing engaging vehicle following mode. The vehicle propulsion controller 102 may be set to initiate vehicle following mode when the vehicle 10 is within a trigger distance of the lead vehicle. When the vehicle is within a predetermined threshold of entering the trigger distance (i.e., the trigger threshold), the method 600 may determine whether the PAC 124 will prevent the VPC 102 from entering vehicle following mode. If the peak deceleration rate is not sufficient to prevent the vehicle from entering the trigger distance, then the vehicle propulsion controller 102 will not be prevented from entering vehicle following mode.

At 612, the method 600 sets the speed limit of vehicle 10 to achieve the peak deceleration speed possible by the vehicle 10. As described, the peak deceleration rate is used to slow down and does not prevent the VPC 102 from triggering vehicle following mode based on the distance to the lead car. At 614, the method 600 may further slowdown the vehicle 10 and increase the distance between the vehicle 10 and the lead car, thereby allowing for the exiting of vehicle following mode.

Figure 7:
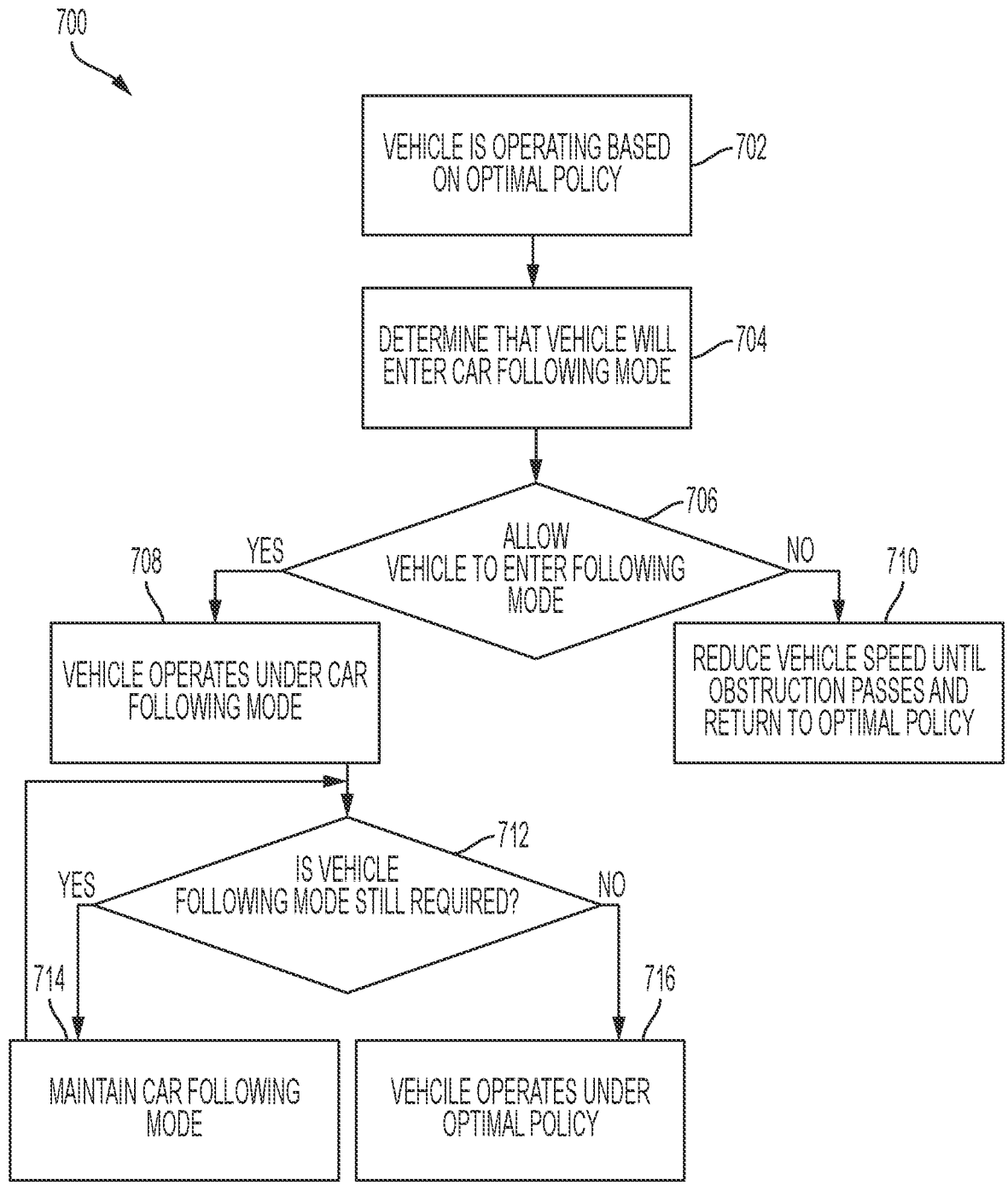
FIG. 7 is a flow diagram generally illustrating an alternative vehicle propulsion control method according to the principles of the present disclosure.

FIG. 7 is a flow diagram generally illustrating an alternative vehicle propulsion control method 700 according to the principles of the present disclosure. At 702, the method 700 receives vehicle parameters. For example, the PAC 124 may receive various vehicle parameters of the vehicle 10 from any of the components described herein. The method 700 may further determine a driving profile based on the optimal driving policy. The method 700, when determining the optimal driving policy may be based on at least one route characteristic, a vehicle energy consumption profile, and historical data indicating energy consumption of a similar vehicle which previously traversed the route.

At 704, the method 700 determines whether to avoid triggering initiation of a vehicle follow mode vehicle follow. For example, the PAC 124 may determine whether to avoid triggering initiation of the vehicle follow mode by the VPC 102 vehicle follow. As described, the PAC 124 may determine whether to allow the VPC 102 to initiate the vehicle following mode based on the speed of the lead vehicle in relation to the speed determined by the optimal policy. As described, the vehicle will enter vehicle following mode when the vehicle is within a trigger distance of the lead vehicle.

At 706, the method 700 determines whether to avoid having the vehicle enter vehicle following mode. For example, the PAC 124 may determine whether to avoid triggering initiation of the vehicle follow mode by the VPC 102 vehicle follow. As described, the PAC 124 may determine whether to avoid triggering initiation of the vehicle follow mode by the VPC 102 vehicle follow based on a determination to enter vehicle following mode which depends on the capabilities of the vehicle 10, the relative speed of the vehicle in view of the lead vehicle, and the optimal policy. The method 700 prioritizes maintaining vehicle operation based on the optimal policy, however if the lead vehicle and the road conditions prevent the ACC from following the optimal policy, the vehicle 10 may not be prevented from operating in vehicle following mode for a time. However, when the vehicle 10 has sufficient capabilities to change lanes in order to avoid vehicle following mode, while maintain operation under the optimal policy, the method 700 instructs the VPC 102 to avoid the obstruction. For example, in response to the vehicle operating on a multilane road, the VPC 102 may determine instruct the vehicle 10 to switch lanes when no lead vehicle is detected in an adjacent lane. The altering of lanes may maintain the optimal policy and the VPC 102 may instruct the vehicle 10 to do so. Only when the optimal policy cannot be maintained does the ACC allow the engaging of vehicle following mode.

At 708, the method 700 has determined that the vehicle 10 may be allowed to enter vehicle following mode. As described, when the speed dictated by the optimal policy cannot be maintained due to a lead vehicle or other similar obstruction, the method 700 may instruct the VPC 102 to slow down the vehicle based on an optimal profile and enter vehicle following mode.

At 710, the method 700, in response to determining that the car may be prevented from entering vehicle following mode, reducing the speed of the vehicle until the lead vehicle, or other similar obstruction, has passed. Once the obstruction has passed, the method 700 operates the vehicle under the optimal policy. Vehicle speed may be reduced by any means by preferably by engine torque.

At 712, the method 700 monitors the conditions of the vehicle and determines if vehicle following mode is still required. As described, for as long as the conditions related to the lead vehicle or other similar obstruction remains, the vehicle may remain in vehicle following mode.

At 714, the method 700, in response to a determination that the vehicle following mode is still required, instructs the VPC 102 to maintain the vehicle following mode. However, if at 712, the method 700 determiners that vehicle following mode is no longer necessary, at 714, the method 700 instructs the VPC 102 to operate under the driving profile for the optimal policy.

Figure 8:
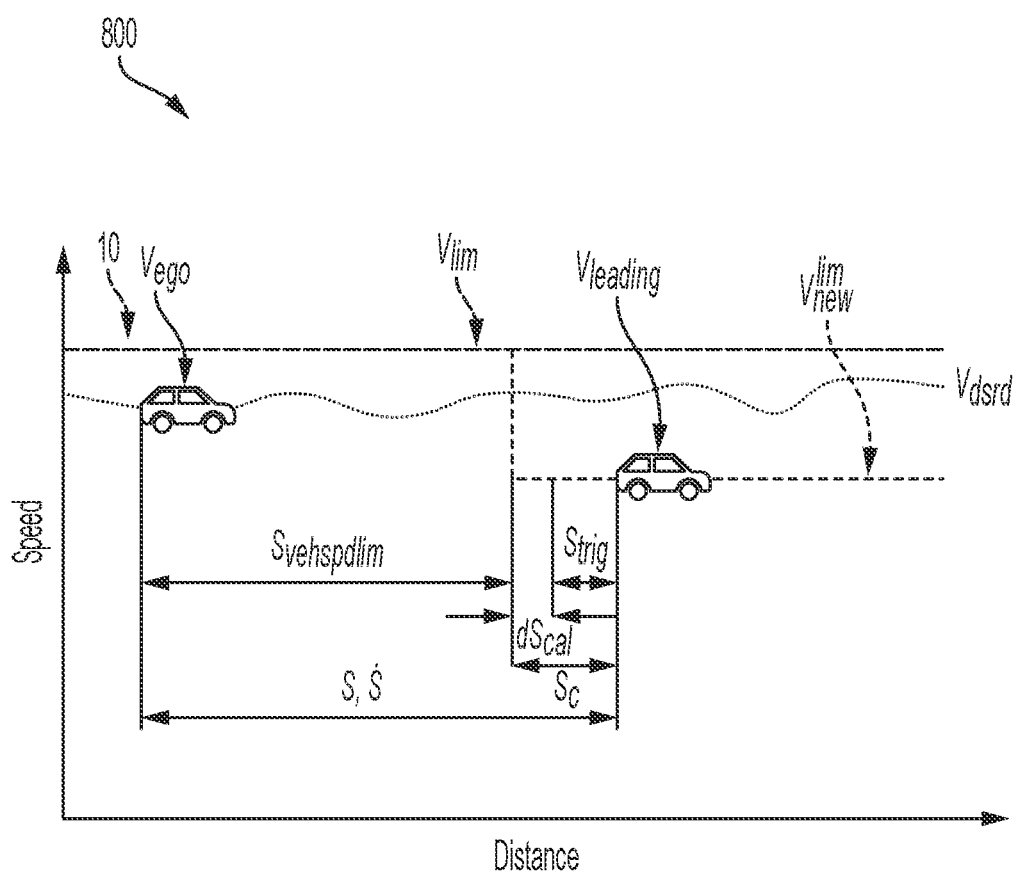
FIG. 8 generally illustrates a vehicle operating environment including a vehicle and a lead vehicle.

FIG. 8 generally illustrates a vehicle operating environment 800 including a vehicle and a lead vehicle. The systems and methods described herein may be configured to detect a lead vehicle. When a lead vehicle is detected, the information available from the RADAR is range (S) and range rate ($\dot{S}$). The speed of the ego vehicle, the speed of the lead vehicle can be estimated by the following equation:

$$V_{leading} = V_{ego} + \dot{S}$$

When $t_c$ is defined as the critical closing time between vehicles that triggers the ACC vehicle following mode, then the associated trigger distance ($S_{trig}$) is defined as:

$$S_{trig} = (V_{ego} - V_{leading}) \times t_c$$

The systems and methods described above, while operating in environment 800, may be configured to stay far enough back from the lead vehicle in order to not have ACC vehicle following mode triggered (and lose room for optimal control). The ego vehicle follows the lead vehicle at a calibratable distance ($dS_{cal}$) beyond the ACC trigger distance ($S_c$) defined as:

$$S_c = S_{trig} + dS_{cal}$$

At a predetermined time the systems and methods described above, while operating in environment 800, may be configured to calculate the distance from the ego vehicle to the desired following point behind the lead vehicle ($S_{vehspdlim}$), which is defined as:

$$\begin{aligned} S_{vehspdlim} &= S - S_c \\ &= S - [S_{trig} + dS_{cal}] \\ &= S - [(V_{ego} + V_{leading}) \times t_c + dS_{cal}] \end{aligned}$$

Figure 9:
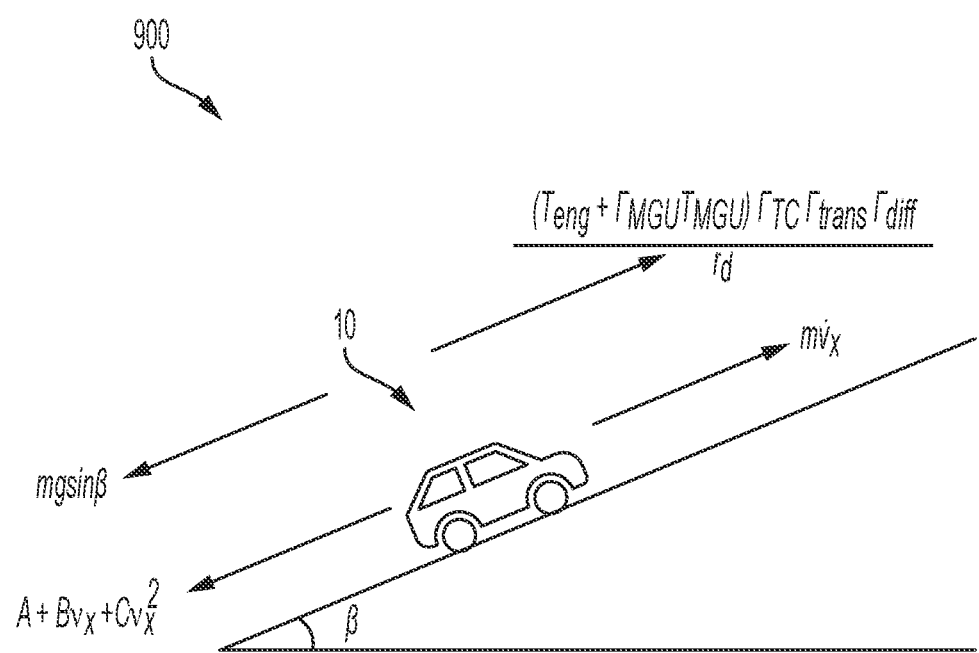
FIG. 9 generally illustrates a vehicle operating environment including a vehicle on an inclined surface.

FIG. 9 generally illustrates a vehicle operating environment 900 including a vehicle on an inclined surface. As described, the vehicle may go into ACC vehicle following mode or automatic emergency braking mode. The systems and methods described herein may be configured to slow down and maintain a safe headway distance to the lead vehicle using the Motor Generator Unit (MGU) driven by ACC. When the systems and methods described herein detect a target vehicle and commands a deceleration to maintain the headway distance, the required MGU torque is back-calculated using linear vehicle dynamics as follows:

$$T_{MGU} = \frac{1}{\Gamma_{MGU}}\left(\frac{(m\dot{v}_x + (A + Bv_x + Cv_x^2) + mg\sin\beta)r_d}{\Gamma_{TC}\Gamma_{trans}\Gamma_{diff}} - T_{eng}\right)$$

Where the engine torque (Nm) and MGU Torque (Nm) are expressed as $T_{eng}$ and $T_{MGU}$ respectively. Further, where vehicle mass (kg), vehicle speed (ms−1), and vehicle acceleration (ms−2) are expressed as m, $v_x$, and $\dot{v}_x$ respectively. Further, where gravitational acceleration (ms−2) is represented as g. Further, where tire radius (m) and road inclination (°) are expressed as $\tau_d$ and β respectively. Further, where MGU gear ratio (−), torque converter torque ratio (−), and transmission gear ratio (−) are expressed as $\Gamma_{MGU}$, $\Gamma_{TG}$, and $\Gamma_{trans}$ respectively.

In some embodiments, a method for controlling vehicle propulsion in environment 900, includes identifying at least one route characteristic of a portion of a route being traversed by a vehicle. The method further includes determining a profile for a target vehicle speed based on the at least one route characteristic and a vehicle energy consumption profile. The method further includes selectively adjusting a vehicle speed control input based on the target vehicle speed profile. The method further includes communicating the vehicle speed control input to a vehicle propulsion controller to achieve the target vehicle speed profile.

In some embodiments, the VPC 102 determines whether to adjust an output based on the vehicle speed control input and based on at least one safety characteristic of the VPC 102. In some embodiments, the vehicle speed control input includes a virtual input to the VPC 102. In some embodiments, the virtual input includes a virtual lead car. In some embodiments, the virtual input includes a virtual human machine interface signal. In some embodiments, the vehicle speed control input includes a target vehicle signal provided directly to the vehicle propulsion controller. In some embodiments, the at least one route characteristic includes at least one of a traffic condition, a traffic signal, and a road grade. In some embodiments, the VPC 102 includes an adaptive cruise control mechanism. In some embodiments, the vehicle energy consumption profile is determined based on at least one vehicle characteristic that contributes to vehicle energy consumption.

In some embodiments, an apparatus for controlling vehicle propulsion includes a memory and a processor. The memory includes instructions executable by the processor to: identify at least one route characteristic of a portion of a route being traversed by a vehicle; determine a profile for a target vehicle speed based on the at least one route characteristic and a vehicle energy consumption profile; selectively adjust a vehicle speed control input based on the target vehicle speed profile; and communicate the vehicle speed control input to a vehicle propulsion controller to achieve the target vehicle speed profile.

In some embodiments, the VPC 102 determines whether to adjust an output based on the vehicle speed control input and based on at least one safety characteristic of the VPC 102. In some embodiments, the vehicle speed control input includes a virtual input to the VPC 102. In some embodiments, the virtual input includes a virtual lead car. In some embodiments, the virtual input includes a virtual human machine interface signal. In some embodiments, the vehicle speed control input includes a target vehicle speed signal provided directly to the VPC 102. In some embodiments, the at least one route characteristic includes at least one of a traffic condition, a traffic signal, and a road grade. In some embodiments, the VPC 102 includes an adaptive cruise control mechanism. In some embodiments, the vehicle energy consumption profile is determined based on at least one vehicle characteristic that contributes to vehicle energy consumption.

In some embodiments, a non-transitory computer-readable storage medium includes executable instructions that, when executed by a processor, facilitate performance of operations, comprising: receiving, from a remotely located computing device, a plurality of route characteristics corresponding to a route being traversed by a vehicle; identifying at least one route characteristic of the plurality of route characteristics, the at least one route characteristic corresponding to a portion of the route being traversed by the vehicle; determining a profile for a target vehicle speed based on the at least one route characteristic and a vehicle energy consumption profile, wherein the vehicle energy consumption profile is predetermined based on vehicle parameters contributing to vehicle energy consumption; selectively adjusting a vehicle speed control input based on the target vehicle speed profile; and communicating the vehicle speed control input to a vehicle propulsion controller to achieve the target vehicle speed profile.

In some embodiments, the VPC 102 determines whether to adjust an output based on the vehicle speed control input and based on at least one safety characteristic of the VPC 102.

In some embodiments, a method for determining an energy efficient vehicle speed includes identifying at least one route characteristic of a portion of a route being traversed by a vehicle. The method further includes determining a profile for a target vehicle speed based on the at least one route characteristic and a vehicle energy consumption profile. The method further includes generating a vehicle speed recommendation. The method further includes providing, to a driver of the vehicle, the vehicle speed recommendation.

In some embodiments, the method further includes determining whether the driver applied the vehicle speed recommendation. In some embodiments, the method further includes adjusting the vehicle speed recommendation based on the determination of whether the driver applied the vehicle speed recommendation. In some embodiments, the vehicle speed recommendation is provided to a display within the vehicle. In some embodiments, the vehicle speed recommendation is provided to a mobile computing device. In some embodiments, the at least one route characteristic includes at least one of a traffic condition, a traffic signal, and a road grade. In some embodiments, the vehicle energy consumption profile is determined based on at least one vehicle characteristic that contributes to vehicle energy consumption.

In some embodiments, an apparatus for determining an energy efficient vehicle speed includes a memory and a processor. The memory includes instructions executable by the processor to: identify at least one route characteristic of a portion of a route being traversed by a vehicle; determine a profile for a target vehicle speed based on the at least one route characteristic and a vehicle energy consumption profile; generate a vehicle speed recommendation; and provide, to a driver of the vehicle, the vehicle speed recommendation.

In some embodiments, the apparatus further includes instructions executable by the processor to determine whether the driver applied the vehicle speed recommendation. In some embodiments, the apparatus further includes instructions executable by the processor to adjust the vehicle speed recommendation based on the determination of whether the driver applied the vehicle speed recommendation. In some embodiments, the vehicle speed recommendation is provided to a display within the vehicle. In some embodiments, the vehicle speed recommendation is provided to a mobile computing device. In some embodiments, the at least one route characteristic includes at least one of a traffic condition, a traffic signal, and a road grade. In some embodiments, the vehicle energy consumption profile is determined based on at least one vehicle characteristic that contributes to vehicle energy consumption.

In some embodiments, a non-transitory computer-readable storage medium includes executable instructions that, when executed by a processor, facilitate performance of operations, comprising: receiving, from a remotely located computing device, a plurality of route characteristics corresponding to a route being traversed by a vehicle; identifying at least one route characteristic of the plurality of route characteristics corresponding to a portion of a route being traversed by a vehicle; determining a profile for a target vehicle speed based on the at least one route characteristic and a vehicle energy consumption profile, wherein the vehicle energy consumption profile is predetermined based on vehicle parameters contributing to vehicle energy consumption; generating a vehicle speed recommendation; and providing, to a driver of the vehicle, the vehicle speed recommendation.

In some embodiments, the non-transitory computer-readable storage medium further includes determining whether the driver applied the vehicle speed recommendation. In some embodiments, the non-transitory computer-readable storage medium further includes adjusting the vehicle speed recommendation based on the determination of whether the driver applied the vehicle speed recommendation. In some embodiments, the vehicle speed recommendation is provided to a display within the vehicle. In some embodiments, the vehicle speed recommendation is provided to a mobile computing device. In some embodiments, the at least one route characteristic includes at least one of a traffic condition, a traffic signal, and a road grade. In some embodiments, the vehicle parameters contributing to vehicle energy consumption are provided by the driver.

In some embodiments, a method for controlling vehicle propulsion includes identifying at least one route characteristic of a portion of a route being traversed by a vehicle. The method further includes determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle. The method further includes receiving, from a vehicle propulsion controller, a signal indicating a detection of a lead vehicle. The method further includes determining a vehicle speed of the lead vehicle. The method further includes determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller. The method further includes, in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold. The method further includes determining an adjusted profile for the target vehicle speed based on the traveling distance and the profile for the target vehicle speed. The method further includes controlling, using the vehicle propulsion controller, vehicle speed of the vehicle to achieve the target vehicle speed associated with the adjusted profile.

In some embodiments, the method may further include determining a deceleration rate for achieving a desired speed for following the lead vehicle. In some embodiments the method may further include determining whether the deceleration rate for achieving the desired speed for following the lead vehicle is greater than, or equal to, a peak deceleration rate of the vehicle. In some embodiments the method may, when the deceleration rate for achieving the desired speed for following the lead vehicle is less than or equal to the peak deceleration rate, set the speed limit based on the speed of the lead vehicle. In some embodiments the method may, when the deceleration rate for following the lead vehicle is less than the peak deceleration rate, set the speed limit to the peak deceleration rate of the vehicle. In some embodiments, the method may include determining whether to avoid triggering initiation of the vehicle follow mode by the vehicle propulsion controller includes calculating the vehicle speed for avoiding the trigger threshold. In some embodiments the method may, in response to determining that the lead vehicle is not detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle. In some embodiments the method may, by the vehicle propulsion controller, the vehicle speed of the vehicle to achieve the target vehicle speed associated with the adjusted profile includes using at least one virtual input provided to the vehicle propulsion controller.

In some embodiments, an apparatus for controlling vehicle propulsion includes a memory and a processor. The memory includes instructions executable by the processor that facilitate the performance of operations comprising identifying at least one route characteristic of a portion of a route being traversed by a vehicle. The apparatus further includes determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle. The apparatus further includes receiving, from a vehicle propulsion controller, a signal indicating a detection of a lead vehicle. The apparatus further includes determining a vehicle speed of the lead vehicle. The apparatus further includes determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller. The apparatus further includes, in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold. The apparatus further includes determining an adjusted profile for the target vehicle speed based on the traveling distance and the profile for the target vehicle speed. The apparatus further includes controlling, using the vehicle propulsion controller, vehicle speed of the vehicle to achieve the target vehicle speed associated with the adjusted profile.

In some embodiments, the apparatus may further include determining a deceleration rate for achieving a desired speed for following the lead vehicle. In some embodiments the apparatus may further include determining whether the deceleration rate for achieving the desired speed for following the lead vehicle is greater than, or equal to, a peak deceleration rate of the vehicle. In some embodiments the apparatus may, when the deceleration rate for achieving the desired speed for following the lead vehicle is less than or equal to the peak deceleration rate, set the speed limit based on the speed of the lead vehicle. In some embodiments the apparatus may, when the deceleration rate for following the lead vehicle is less than the peak deceleration rate, set the speed limit to the peak deceleration rate of the vehicle. In some embodiments, the apparatus may include determining whether to avoid triggering initiation of the vehicle follow mode by the vehicle propulsion controller includes calculating the vehicle speed for avoiding the trigger threshold. In some embodiments the apparatus may, in response to determining that the lead vehicle is not detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle. In some embodiments the apparatus may, by the vehicle propulsion controller, the vehicle speed of the vehicle to achieve the target vehicle speed associated with the adjusted profile includes using at least one virtual input provided to the vehicle propulsion controller.

In some embodiments, a non-transitory computer-readable storage medium which includes executable instructions that, when executed by a processor, facilitate performance of operations, comprising identifying at least one route characteristic of a portion of a route being traversed by a vehicle. The non-transitory computer-readable medium further facilitates the performance of operations including determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle. The non-transitory computer-readable medium further facilitates the performance of operations including receiving, from a vehicle propulsion controller, a signal indicating a detection of a lead vehicle. The non-transitory computer-readable medium further facilitates the performance of operations including determining a vehicle speed of the lead vehicle. The non-transitory computer-readable medium further facilitates the performance of operations including determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller. The non-transitory computer-readable medium further facilitates the performance of operations including, in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold. The non-transitory computer-readable medium further facilitates the performance of operations including determining an adjusted profile for the target vehicle speed based on the traveling distance and the profile for the target vehicle speed. The non-transitory computer-readable medium further facilitates the performance of operations including controlling, using the vehicle propulsion controller, vehicle speed of the vehicle to achieve the target vehicle speed associated with the adjusted profile.

In some embodiments, the non-transitory computer readable medium may further include determining a deceleration rate for achieving a desired speed for following the lead vehicle. In some embodiments the non-transitory computer readable medium may further include determining whether the deceleration rate for achieving the desired speed for following the lead vehicle is greater than, or equal to, the peak deceleration rate of the vehicle. In some embodiments the non-transitory computer readable medium may, when the deceleration rate for achieving the desired speed for following the lead vehicle is less than or equal to the peak deceleration rate, set the speed limit based on the speed of the lead vehicle. In some embodiments the non-transitory computer readable medium may, when the deceleration rate for following the lead vehicle is less than the peak deceleration rate, set the speed limit to the peak deceleration rate of the vehicle. In some embodiments, the non-transitory computer readable medium may include determining whether to avoid triggering initiation of the vehicle follow mode by the vehicle propulsion controller to initiate vehicle following mode includes calculating the vehicle speed for avoiding the trigger threshold. In some embodiments the non-transitory computer readable medium may, in response to determining that the lead vehicle is not detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle. In some embodiments the non-transitory computer readable medium may, by the vehicle propulsion controller, the vehicle speed of the vehicle to achieve the target vehicle speed associated with the adjusted profile includes using at least one virtual input provided to the vehicle propulsion controller.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling vehicle propulsion, the method comprising:
   identifying at least one route characteristic of a portion of a route being traversed by a vehicle;
   determining a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle;
   receiving, from a vehicle propulsion controller, a signal indicating a detection of a lead vehicle;
   determining a vehicle speed of the lead vehicle;
   determining whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller;
   in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold;
   determining an adjusted profile for the target vehicle speed based on the traveling distance and the profile for the target vehicle speed; and
   controlling, using the vehicle propulsion controller, vehicle speed of the vehicle to achieve the target vehicle speed associated with the adjusted profile.

2. The method of claim 1, further comprising:
   determining a deceleration rate for achieving a desired speed for following the lead vehicle; and
   determining whether the deceleration rate for achieving the desired speed for following the lead vehicle is less than, or equal to, a peak deceleration rate of the vehicle.

3. The method of claim 2, further comprising in response to the deceleration rate for achieving the desired speed for following the lead vehicle being less than or equal to the peak deceleration rate, adjust the profile for the target vehicle speed further based on the speed of the lead vehicle.

4. The method of claim 2, further comprising, in response to the deceleration rate for achieving the desired speed for following the lead vehicle being greater than the peak deceleration rate, controlling vehicle propulsion according to the peak deceleration rate of the vehicle.

5. The method of claim 1 wherein determining whether to avoid triggering initiation of the vehicle follow mode by the vehicle propulsion controller includes calculating a vehicle speed for avoiding the trigger threshold.

6. The method of claim 1 further comprising, in response to determining that the lead vehicle not being detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle.

7. The method of claim 1 further comprising controlling, by the vehicle propulsion controller, the vehicle speed of the vehicle to achieve the target vehicle speed associated with the adjusted profile includes using at least one virtual input provided to the vehicle propulsion controller.

8. An apparatus for controlling vehicle propulsion comprising:
a memory; and
a processor, wherein the memory includes instructions executable by the processor to:
identify at least one route characteristic of a portion of a route being traversed by a vehicle;
determine a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle;
receive, from a vehicle propulsion controller, a signal indicating a detection of a lead vehicle;
determine a vehicle speed of the lead vehicle;
determine whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller;
in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold;
determine an adjusted profile for the target vehicle speed based on the traveling distance and the profile for the target vehicle speed; and
control, using the vehicle propulsion controller, vehicle speed of the vehicle to achieve the target vehicle speed associated with the adjusted profile.

9. The apparatus of claim 8, further comprising:
determining a deceleration rate for achieving a desired speed for following the lead vehicle; and
determining whether the deceleration rate for achieving the desired speed for following the lead vehicle is less than, or equal to, a peak deceleration rate of the vehicle.

10. The apparatus of claim 9, further comprising in response to the deceleration rate for achieving the desired speed for following the lead vehicle less than or equal to the peak deceleration rate, set the speed limit based on the speed of the lead vehicle.

11. The apparatus of claim 9, further comprising in response to the deceleration rate for achieving the desired speed for following the lead vehicle greater than the peak deceleration rate, set the speed limit to the peak deceleration rate of the vehicle.

12. The apparatus of claim 8 determining whether to avoid triggering initiation of the vehicle follow mode by the vehicle propulsion controller includes calculating a vehicle speed for avoiding the trigger threshold.

13. The apparatus of claim 8 wherein the instructions further cause the processor to, in response to determining that the lead vehicle not being detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle.

14. The apparatus of claim 8 wherein the instructions further cause the processor to, control, by the vehicle propulsion controller, the vehicle speed of the vehicle to achieve the target vehicle speed associated with the adjusted profile includes using at least one virtual input provided to the vehicle propulsion controller.

15. A non-transitory computer-readable storage medium, comprising executable instructions that, when executed by a processor, facilitate performance of operations, comprising:
identify at least one route characteristic of a portion of a route being traversed by a vehicle;
determine a profile for a target vehicle speed based on the at least one route characteristic and a vehicle energy consumption profile, the vehicle energy consumption profile being determined based on, at least, historical data indicating energy consumption of the vehicle for at least a portion of a route previously traversed by the vehicle having at least one route characteristic corresponding to at the at least one route characteristic of the portion of the route being traversed by the vehicle;
receive, from a vehicle propulsion controller, a signal indicating a detection of a lead vehicle;
determine a vehicle speed of the lead vehicle;
determine whether to avoid triggering initiation of a vehicle follow mode by the vehicle propulsion controller based on (i) a distance between the vehicle and a triggering threshold and (ii) the vehicle speed of the vehicle, the triggering threshold corresponding to a distance to the lead vehicle at which the vehicle follow mode is initiated by the vehicle propulsion controller;
in response to determining to avoid triggering initiation of the vehicle follow mode by the vehicle propulsion controller, determining, based on the vehicle speed of the lead vehicle and the profile for the target vehicle speed, a traveling distance between the vehicle and a trigger threshold;
determine an adjusted profile for the target vehicle speed based on the traveling distance and the profile for the target vehicle speed; and
control, using the vehicle propulsion controller, vehicle speed of the vehicle to achieve the target vehicle speed associated with the adjusted profile.

16. The non-transitory computer-readable storage medium of claim 15, further comprising:
determining a deceleration rate for achieving a desired speed for following the lead vehicle; and
determining whether the deceleration rate for achieving the desired speed for following the lead vehicle is less than, or equal to, a peak deceleration rate of the vehicle.

17. The non-transitory computer-readable storage medium of claim 16, further comprising in response to the deceleration rate for achieving the desired speed for following the lead vehicle less than or equal to the peak deceleration rate, set the speed limit based on the speed of the lead vehicle.

18. The non-transitory computer-readable storage medium of claim 16, further comprising in response to the deceleration rate for achieving the desired speed for following the lead vehicle greater than the peak deceleration rate, set the speed limit to the peak deceleration rate of the vehicle.

19. The non-transitory computer-readable storage medium of claim 15 wherein determining whether to avoid triggering initiation of the vehicle follow mode by the vehicle propulsion controller mode includes calculating a vehicle speed for avoiding the trigger threshold.

20. The non-transitory computer-readable storage medium of claim 15 further comprising, in response to determining the lead vehicle not being detected, generating a subsequently adjusted profile for the target vehicle speed based on at least one subsequent route characteristic and the vehicle energy consumption profile, the at least one subsequent route characteristic corresponding to a subsequent portion of the route being traversed by the vehicle.

* * * * *